(12) United States Patent
Parks et al.

(10) Patent No.: US 7,643,078 B2
(45) Date of Patent: Jan. 5, 2010

(54) CCD WITH IMPROVED CHARGE TRANSFER

(75) Inventors: Christopher Parks, Rochester, NY (US); H. Marc Hunt, Webster, NY (US)

(73) Assignee: Eastman Kodak Company, Rochester, NY (US)

( * ) Notice: Subject to any disclaimer, the term of this patent is extended or adjusted under 35 U.S.C. 154(b) by 376 days.

(21) Appl. No.: 11/437,536

(22) Filed: May 19, 2006

(65) Prior Publication Data

US 2007/0268390 A1    Nov. 22, 2007

(51) Int. Cl.
*H04N 3/14* (2006.01)
*H04N 5/335* (2006.01)
*H01N 27/148* (2006.01)

(52) U.S. Cl. .................. 348/312; 348/311; 257/246; 257/215

(58) Field of Classification Search ......... 348/294–301, 348/311–325; 257/215, 246, 251
See application file for complete search history.

(56) References Cited

U.S. PATENT DOCUMENTS

| 4,689,808 | A  | * | 8/1987  | Moorman et al. ............. 377/60 |
| 6,452,634 | B1 |   | 9/2002  | Ishigami et al. |
| 6,462,779 | B1 |   | 10/2002 | Philbrick |
| 6,957,350 | B1 | * | 10/2005 | Demos ........................ 380/203 |
| 7,015,520 | B1 | * | 3/2006  | Parks ........................... 257/246 |
| 7,015,966 | B1 | * | 3/2006  | Lin .............................. 348/324 |
| 7,268,885 | B2 | * | 9/2007  | Chan et al. .................. 356/489 |
| 2004/0130642 | A1 | * | 7/2004 | Imamura et al. ............ 348/311 |

FOREIGN PATENT DOCUMENTS

| EP | 0495523 | 7/1992 |
| EP | 0513666 | 11/1992 |

* cited by examiner

*Primary Examiner*—Lin Ye
*Assistant Examiner*—Carramah J Quiett
(74) *Attorney, Agent, or Firm*—Peyton C. Watkins; Nancy R. Sirmon

(57) ABSTRACT

A charge coupled device having a plurality of non-adjacent first gate electrode pairs; a plurality of second gate electrode pairs placed in every second space between the first gate electrode pairs; a plurality of third gate electrode pairs placed in the spaces between the first gate electrode pairs not occupied by the second gate electrode pairs; wherein, in a full resolution mode, the first gate electrode pairs are clocked substantially 180 degrees out of phase with respect to the second and third gate electrode pairs and the second and third gate electrode pairs are clocked substantially equally; and wherein, in a half resolution, double speed mode, the second and third gate electrode pairs are clocked substantially 180 degrees out of phase with respect to each other and substantially 50% duty cycle and the first gate electrode pairs are clocked with 25% or less duty cycle and 90 degrees out of phase with respect to the second gate electrode pairs.

8 Claims, 4 Drawing Sheets

![US 7,643,078 B2]

CCD WITH IMPROVED CHARGE TRANSFER

FIELD OF THE INVENTION

The invention relates generally to the field of charge-coupled devices and, more particularly, to improving the charge transfer electric field in a CCD operating in a half resolution mode.

BACKGROUND OF THE INVENTION

FIG. 1 shows a prior art charge coupled device (CCD) operable in two modes. The first mode is a full-resolution image read out mode and the second mode is a half-resolution double speed read out mode. In the double speed read out mode, two adjacent charge packets are summed together and are transferred two times faster than in full resolution mode. These two modes allow for a two-dimensional pixel array to be read out in a full resolution still photography imaging mode and a reduced resolution video-imaging mode. Examples of this prior art can be found in patents U.S. Pat. Nos. 6,452,634 and 6,462,779.

In FIG. 1, a pseudo-2-phase CCD is shown with every other gate pair connected to timing signal H1. The gate pairs between H1 alternate between timing signals H2 and H3. FIG. 2 shows the timing signals for the full-resolution read out of FIG. 1. In full-resolution mode, H2 and H3 are clocked the same and with the opposite phase of H1. This timing causes the charge packets in the CCD to be advanced by two gate pairs for each clock cycle.

FIG. 3 shows the transfer of charge in the half-resolution double speed read out mode and FIG. 4 shows the timing signals for FIG. 3. H1 is held at a constant DC voltage. H2 and H3 are now clocked with opposite phase. The amplitude of the clock signals H2 and H3 is double the full-resolution mode amplitude shown in FIG. 2. This double speed timing advances the charge packets four gate pairs in one clock cycle, twice as far as the full-resolution mode. The double speed timing mode also sums together two adjacent charge packets to reduce the resolution by one half.

One deficiency of the charge transfer shown in FIG. 3 is the voltage potential steps are small and the distance the charge travels is long. Consequently, it is desirable to increase the voltage between adjacent gate pairs to increase the electric field strength in the CCD. An increased electric field will improve the charge transfer efficiency.

SUMMARY OF THE INVENTION

The present invention is directed to overcoming one or more of the problems set forth above. Briefly summarized, according to one aspect of the present invention, the method resides in a charge coupled device having a plurality of non-adjacent, first gate electrode pairs; a plurality of second gate electrode pairs placed in every second space between the first gate electrode pairs; a plurality of third gate electrode pairs placed in the spaces between the first gate electrode pairs not occupied by the second gate electrode pairs; wherein, in a full resolution mode, the first gate electrode pairs are clocked substantially 180 degrees out of phase with respect to the second and third gate electrode pairs and the second and third gate electrode pairs are clocked substantially equally; wherein, in a half resolution, double speed mode, the second and third gate electrode pairs are clocked substantially 180 degrees out of phase with respect to each other and substantially 50% duty cycle and the first gate electrode pairs are clocked with 25% or less duty cycle and 90 degrees out of phase with respect to the second gate electrode pairs.

The above and other objects of the present invention will become more apparent when taken in conjunction with the following description and drawings wherein identical reference numerals have been used, where possible, to designate identical elements that are common to the figures.

Advantageous Effect Of The Invention

The present invention has the following advantages of increasing the voltage between adjacent gate pairs to increase the electric field strength in the CCD. An increased electric field will improve the charge transfer efficiency.

DETAILED DESCRIPTION OF THE INVENTION

Figure 1:
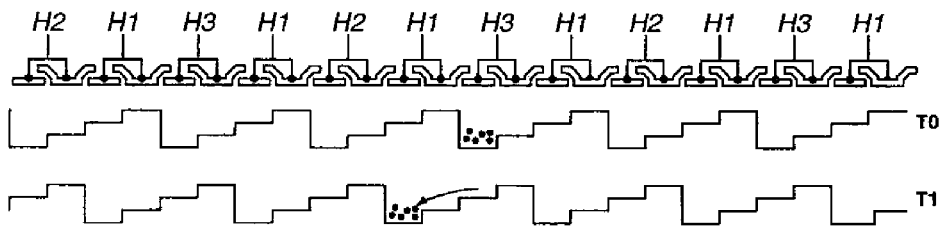
FIG. 1 is prior art showing full resolution CCD charge transfer.
Figure 2:
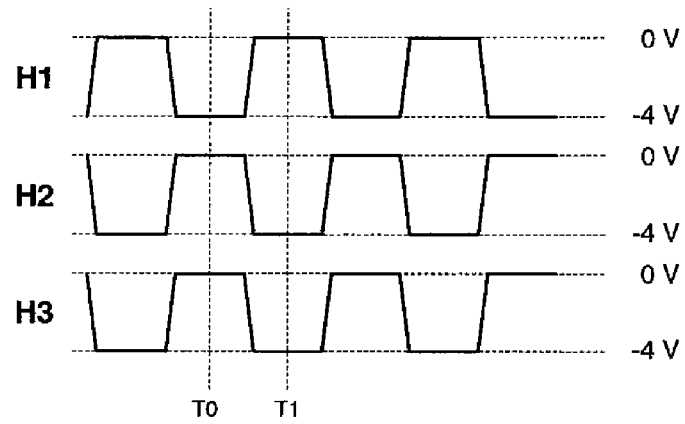
FIG. 2 is the prior art timing diagram for FIG. 1.
Figure 3:
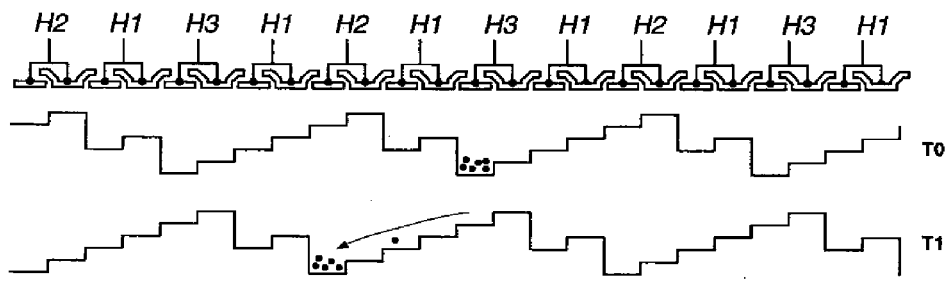
FIG. 3 is prior art showing half resolution double speed CCD charge transfer.
Figure 4:
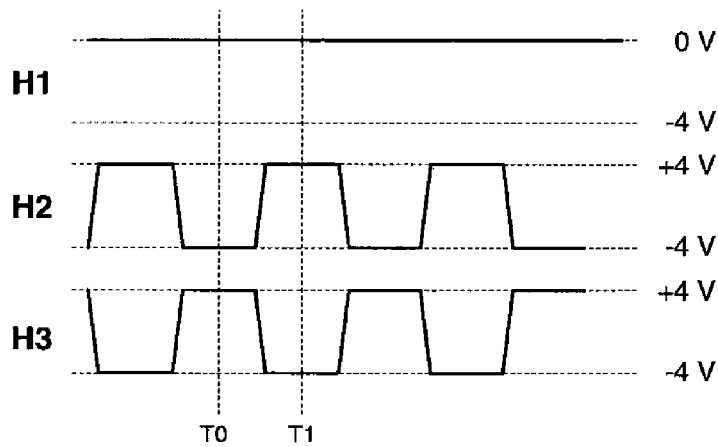
FIG. 4 is the prior art timing diagram for FIG. 3.
Figure 5:
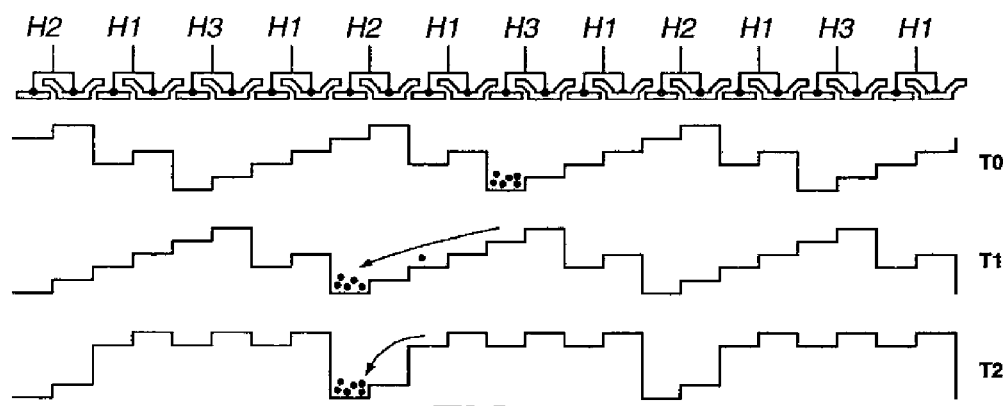
FIG. 5 is a charge transfer in a half resolution double speed CCD with increased electric field for improved charge transfer efficiency.
Figure 6:
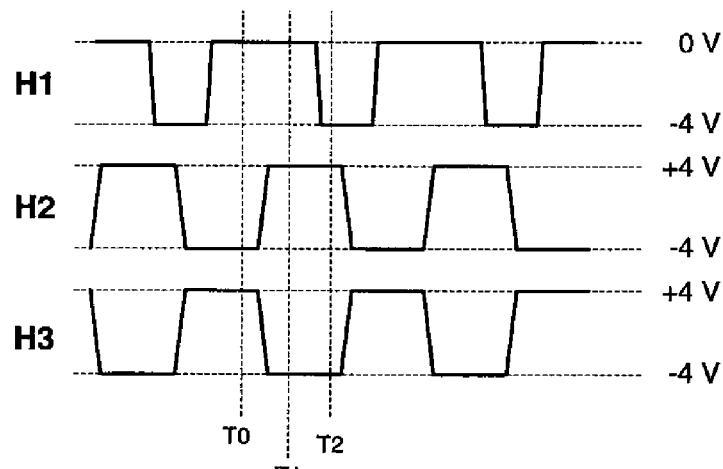
FIG. 6 is the timing diagram for FIG. 5.

FIG. 5 shows an image sensor CCD 10 with improved half resolution double speed mode charge transfer efficiency. It consists of three gate pairs H1, H2, and H3. Every other gate pair is connected to timing signal H1. The gate pairs between H1 alternate between timing signals H2 and H3. The timing signals for FIG. 5 are shown in FIG. 6. In half-resolution double speed mode, the CCD timing signals H2 and H3 are clocked 180 degrees or substantially 180 degrees out of phase with respect to each other and with double the amplitude of timing signal H1. The H2 and H3 timing signals have a 50% duty cycle. Unlike the prior art, timing signal H1 is clocked with less than a 50% duty cycle and 90 degrees out of phase from timing signal H2. This sets up the situation in FIG. 5 at time step T2. Here the channel potential voltage difference from gate pairs H1 to H2 is twice as large as the prior art. This will double the electric field strength within the CCD and improve charge transfer efficiency. It also causes charge to transfer through four gate pairs in one clock cycle and it sums together two adjacent charge packets. This allows for a reduced resolution image sensor with a faster frame rate.

Figure 7:
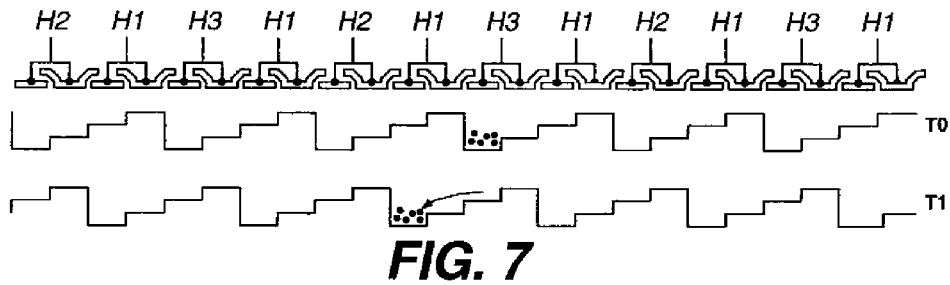
FIG. 7 is a charge transfer for the full resolution mode.
Figure 8:
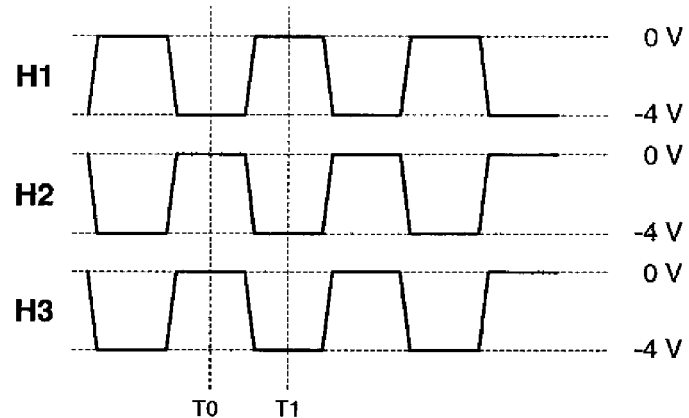
FIG. 8 is the timing diagram for FIG. 7.

FIG. 7 shows the charge transfer when the CCD is clocked in full-resolution read out mode. The timing diagram for FIG. 7 is shown in FIG. 8. Here the normal two-phase clocking is applied to the gate pairs. H2 and H3 are clocked in phase with respect to each other and with half the amplitude of the half resolution double speed mode. The H1 timing signal is clocked 180 degrees out of phase or substantially 180 degrees out of phase with respect to H2 or H3. The amplitude of the timing signals can be the same as the half resolution double speed mode or they can be set to one half amplitude (as shown in FIG. 8). Normally the clock voltage amplitude in full-resolution mode would be set to one half to conserve power.

Figure 9:
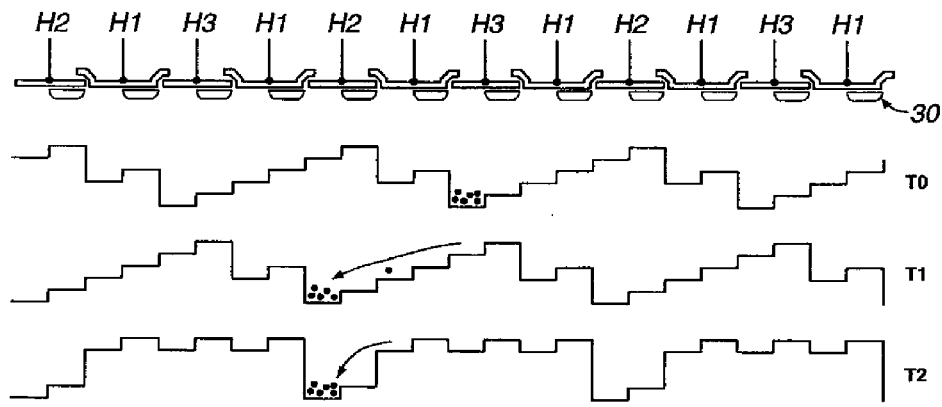
FIG. 9 is the invention implemented with a true-2-phase CCD.

The invention thus far has been described in the context of a pseudo-2-phase CCD where adjacent gate pairs are connected together. The invention will work equally well with a CCD of the true-2-phase design as shown in FIG. 9. The extra channel potential adjusting implant 30 creates a step in the channel potential under each gate. The timing signals applied to the gates H1, H2, and H3 are the same as in FIG. 6.

Figure 10:
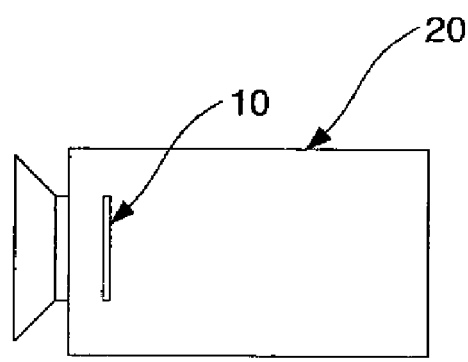
FIG. 10 is a digital camera using an image sensor employing a half resolution double speed CCD with increased electric field for improved charge transfer efficiency.

FIG. 10 illustrates a digital camera 20 having the CCD image sensor 10 disposed therein for illustrating a typical commercial embodiment to which the ordinary consumer is accustomed.

The invention has been described with reference to a preferred embodiment. However, it will be appreciated that variations and modifications can be effected by a person of ordinary skill in the art without departing from the scope of the invention.

PARTS LIST

| | |
|---|---|
| 10 | image sensor CCD |
| 20 | digital camera |
| 30 | extra channel potential adjusting implant |

What is claimed is:

1. A charge coupled device comprising:
   (a) a plurality of non-adjacent, first gate electrodes;
   (b) a plurality of second gate electrodes with one second gate electrode placed between every other pair of first gate electrodes;
   (c) a plurality of third gate electrodes with one third gate electrode placed between remaining pairs of first gate electrodes not having a second gate electrode therebetween; and
   (d) a first timing signal connected to the plurality of first gate electrodes, a second timing signal connected to the plurality of second gate electrodes, and a third timing signal connected to the plurality of third gate electrodes,
   wherein, in a full resolution mode, the first gate electrodes are clocked substantially 180 degrees out of phase with respect to the second and third gate electrodes and the second and third gate electrodes are clocked substantially equally; and
   wherein, in a half resolution, double speed mode, the second and third gate electrodes are clocked substantially 180 degrees out of phase with respect to each other and substantially 50% duty cycle and the first gate electrodes are clocked with 25% or less duty cycle and 90 degrees out of phase with respect to the second gate electrodes.

2. The charge coupled device of claim 1, wherein each of the first, second, and third gate electrodes comprise two gate electrodes connected together to form a gate electrode pair.

3. A method of clocking a charge coupled device including a repeating pattern of gate electrodes, wherein the pattern of gate electrodes comprises a first gate electrode, a second sate electrode adjacent to the first gate electrode, another first gate electrode adjacent to the second gate electrode, and a third gate electrode adjacent to the other first sate electrode, the method comprising the steps of:
   (a) clocking, in a full resolution mode, the first gate electrodes substantially 180 degrees out of phase with respect to the second and third gate electrodes and clocking the second and third gate electrodes substantially equally; and
   (b) clocking, in a half resolution, double speed mode, the second and third gate electrodes substantially 180 degrees out of phase with respect to each other and substantially 50% duty cycle and clocking the first gate electrodes with 25% or less duty cycle and 90 degrees out of phase with respect to the second gate electrodes.

4. The method as in claim 3 wherein each of the first, second, and third gate electrodes comprise two sate electrodes connected together to form a gate electrode pair.

5. A camera comprising:
   a charge coupled device comprising:
   (a) a plurality of non-adjacent, first gate electrodes;
   (b) a plurality of second gate electrodes with one second gate electrode placed between every other pair of first gate electrodes; and
   (c) a plurality of third gate electrodes with one third gate electrode placed between remaining pairs of first gate electrodes not having a second gate electrode therebetween; and
   (d) a first timing signal connected to the plurality of first gate electrodes, a second timing signal connected to the plurality of second gate electrodes, and a third timing signal connected to the plurality of third gate electrodes,
   wherein, in a full resolution mode, the first gate electrodes are clocked substantially 180 degrees out of phase with respect to the second and third gate electrodes and the second and third gate electrodes are clocked substantially equally; and
   wherein, in a half resolution, double speed mode, the second and third gate electrodes are clocked substantially 180 degrees out of phase with respect to each other and substantially 50% duty cycle and the first gate electrodes are clocked with 25% or less duty cycle and 90 degrees out of phase with respect to the second gate electrodes.

6. The camera as in claim 5, wherein each of the first, second, and third gate electrodes comprise two gate electrodes.

7. The charge coupled device of claim 1, further comprising a channel potential adjusting implant disposed partially under each first, second, and third gate electrode.

8. The camera of claim 5, wherein the charge coupled device further includes a channel potential adjusting implant disposed partially under each first, second, and third gate electrode.

* * * * *